United States Patent [19]
Schindel

[11] 3,855,151

[45] Dec. 17, 1974

[54] REACTIVATION OF SPENT CHROMIC FLUORIDE CATALYSTS

[75] Inventor: Wesley Gerald Schindel, Pennsville, N.J.

[73] Assignee: E. I. du Pont de Nemours and Company, Wilmington, Del.

[22] Filed: Sept. 24, 1973

[21] Appl. No.: 400,042

[52] U.S. Cl............ 252/415, 252/441, 260/653.7, 423/492
[51] Int. Cl............................................ B01j 11/02
[58] Field of Search ......... 252/415, 441; 260/653.7, 260/653.6; 423/492

[56] References Cited
UNITED STATES PATENTS

| | | | |
|---|---|---|---|
| 2,110,369 | 3/1938 | Leicester | 260/653.7 |
| 3,385,794 | 5/1968 | Scherer et al. | 252/415 |
| 3,600,450 | 8/1971 | Kaess et al. | 252/441 |
| 3,632,834 | 1/1972 | Christoph | 252/441 |
| 3,660,307 | 5/1972 | Scherer et al. | 252/415 |

Primary Examiner—Patrick P. Garvin
Assistant Examiner—A. P. Demers
Attorney, Agent, or Firm—James A. Costello

[57] ABSTRACT

Disclosed herein is a process for reactivating spent chromic fluoride catalyst which can be carbon-supported, comprising reacting the spent catalyst at elevated temperatures with selected chlorine-containing organic compounds and, in certain instances, chlorine. The catalyst is employed in vapor phase halogen exchange between hydrogen fluoride and chlorocarbon compounds to produce fluorocarbon compounds and chlorofluorocarbon compounds.

10 Claims, No Drawings

REACTIVATION OF SPENT CHROMIC FLUORIDE CATALYSTS

BACKGROUND OF THE INVENTION

1. Field of the Invention

Spent chromic fluoride catalysts are reactivated by reaction thereof with chlorocarbon compounds and, depending on the particular chlorocarbon compounds employed, chlorine. The catalysts are useful in making fluorocarbon and chlorofluorocarbon compounds.

2. Description of the Prior Art

Anhydrous chromic (Cr III) fluoride supported on carbon is employed industrially to catalyze vapor phase halogen exchange between hydrogen fluoride and one and two carbon chloroorganics such as chloroform, carbon tetrachloride, and hexachloroethane. By successive replacement of chlorine by fluorine atoms there is produced a series of products useful as refrigerants, aerosol propellants, solvents, dielectric gases etc. Frequently, elemental chlorine is employed along with the hydrogen fluoride in order to produce more highly halogenated products than would be expected from simple exchange of chlorine atoms for fluorine atoms. For example, it is often preferred to employ a mixture of tetrachloroethylene and chlorine, which forms hexachloroethane in situ, in place of the normally solid and consequently more difficultly handled hexachloroethane.

Carbon-supported chromic (Cr III) fluoride catalysts are normally packed in heated fixed bed tower reactors through which the reactants are passed in the gas phase. In this use, the so-called conversion of the catalyst, as measured by moles of carbon-chlorine bonds converted to carbon-fluorine bonds per pass, gradually decreases until it is no longer economic to operate the column and the catalyst must be replaced. At this point, the catalyst is said to be spent. Typically, such columns can be operated up to 1,000 or 1,500 hours before the catalyst conversion decreases to an extent that the catalyst must be replaced although 750 hrs. is preferred. Under the conditions of a standard test hereinafter described, spent catalysts provide less than about 10 percent conversion. Replacement of catalyst is expensive in terms of materials cost and plant "down time" with consequent lost production.

SUMMARY OF THE INVENTION

This invention concerns a process for reactivating a spent chromic (Cr III) fluoride halogen-exchange catalyst comprising reacting the spent catalyst, at a temperature from about 300° to 500°C., with a chlorine-source selected from i. a saturated organic compound containing 1 or 2 carbon atoms, from 2 to 6 chlorine atoms and no hydrogen atoms, capable of dissociation at reaction temperatures to produce chlorine, and ii. a saturated organic compound containing one or 2 carbon atoms and from 2 to 6 chlorine atoms, not capable of dissociation at reaction temperatures to produce chlorine, and chlorine, thereby converting at least a part of the chromic fluoride to chromic (Cr III) chloride.

The reaction between the spent catalyst and the chlorine-source is metathetical. The chlorine-source can be solely the organic compound provided that the compound dissociates significantly at the reaction temperature to produce chlorine. Otherwise, chlorine itself has to be employed in addition to the organic compound. It should be understood that the catalyst that is reactivated by the process taught herein can be either in bulk form, or, carbon-supported and can be reactivated several times at least.

The preferred reactivation temperatures are between about 375° to 450°C., with the most preferred temperature being about 450°C.

Those skilled in the art are guided in their determination of whether prospective chlorine-source compounds are operable in this process and are guided in determining in which of groups (i) or (ii) they belong, by the following description. Prospective chlorine-source compounds belong in group (i) if they undergo metathesis with $CrF_3$ and if they evolve significant (but not necessarily large) amounts of chlorine gas. Prospective chlorine-source compounds belong in group (ii) if they undergo metathesis with $CrF_3$ but evolve no significant amounts of chlorine gas. The test for metathesis reactions should be conducted, of course, at about 300° to 500°C.

DETAILS OF THE INVENTION

Examples of typical catalysts that can be reactivated according to the process of this invention are described in more detail in co-assigned U.S. Pat. No. 3,632,834. Such catalysts are chromium trifluoride in bulk form or supported on a carbon support. The bulk form can be prepared by partial dehydration of a hydrous chromium chloride such as $CrCl_3 \cdot 6H_2O$ to a lower hydrate followed by treatment with HF at elevated temperatures, e.g., greater than 200°C. (with about 400°C. being preferred), which first converts the $CrCl_3$ hydrate to the anhydrous form, then replaces chlorine with fluorine to form $CrF_3$.

The chromium trifluoride-on-carbon catalysts can be prepared by treating the carbon support with an aqueous solution of chromium trichloride hexahydrate ($CrCl_3 \cdot 6H_2O$) until the desired amount of the chromium salt is absorbed. The solids are then dried to evaporate water, e.g., at about 110°C. The superficially dry solids are then further dried at 400°C. with gaseous hydrogen fluoride. X-ray and electron diffraction studies of catalysts produced in this manner indicate the chromium to be in the form of chromium trifluoride.

The active catalysts have a large surface area and crystals thereof are small and, if distributed on a carbon support, are distributed uniformly over all surfaces. Spent catalysts have substantially lesser surface areas and the chromic fluoride is present in larger crystals.

Reduced conversion can be explained by the lesser area of the larger crystals and by blockage of the pores of the supporting carbon, if supporting carbon is employed, by the large crystals thus to deny access of the reactants to the catalyst within the carbon granules.

Without being limited to any theory of how the invention works, the reactivation of the chromic (Cr III) fluoride catalysts appears to take place in the following steps:

1. metathesis occurs between the chlorine-source (regenerant) and chromic fluoride to convert the chromic fluoride to chromic (Cr III) chloride or mixed chromic chlorofluorides;

2. in the presence of chlorine, which may simultaneously be provided by the regenerant itself or which may be provided in a separate step, the chromic chloride or mixed chlorofluorides are rendered mobile. The chromic chloride or mixed chlorofluorides are thus redistributed in small crystals of large surface area. If the crystals are supported on carbon, the crystals will be uniformly distributed over all the support surfaces.

On placing the catalyst in service in the presence of hydrogen fluoride, the redistributed chromic (Cr III) chloride or mixed chlorofluorides are reconverted to catalytically active chromic fluoride. Alternatively, the chromic chloride or mixed chlorofluorides may be converted to chromic fluoride by treatment with hydrogen fluoride in a separate step before placing the catalyst in service. Reconversion to chromic fluoride is not a part of this invention.

The minimum effective amount of regenerant necessary to reactivate the spent catalyst in accordance with this invention cannot be precisely stated. Amounts depend upon the particular regenerant and the degree of reactivation that is desired. It can be said in this connection that carbon tetrachloride reacted with spent carbon-supported $CrF_3$ at 375°C. in an amount of 1/3 by weight of the catalyst was effective to increase conversion from 7.4 percent to 12.3 percent.

The Chlorine-Source Organic Compound Solely

The organic chlorine-source regenerants produce chlorine by dissociation. Such chlorine-sources include, but are not limited to, carbon tetrachloride, phosgene, hexachloroethane and trichlorofluoromethane. Dichlorodifluoromethane is operable but is not preferred.

The preferred regenerant, carbon tetrachloride, reacts with chromic fluoride in the sense of the following unbalanced equation:

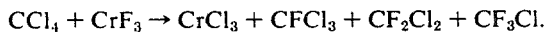

$$CCl_4 + CrF_3 \rightarrow CrCl_3 + CFCl_3 + CF_2Cl_2 + CF_3Cl.$$

I.

As an example of how the organic chlorine-sources produce chlorine, carbon tetrachloride undergoes the following reaction:

$$2CCl_4 \rightarrow 2CCl_3\cdot + 2Cl\cdot \rightarrow CCl_3CCl_3 + Cl_2.$$

II.

Hexachloroethane is a solid and is difficult to handle in the process of this invention. Hence, it is preferred to make it in situ by feeding a mixture of tetrachloroethylene and an equivalent amount of chlorine to the catalyst being reactivated. Mixtures of chlorine-sources are useful as regenerants, an example being a waste stream from a commercial hydrogen fluoride halogen exchange reaction with carbon tetrachloride.

That chromic chloride was formed after reactivation of several spent catalysts with carbon tetrachloride, for 2 hours at 450°C., was confirmed by X-ray diffraction analysis. Although the bulk of the treated catalysts consisted of amorphous regions which yielded no diffraction pattern, the crystalline regions yielded patterns establishing that they consisted almost entirely of chromium trichloride. The color of the treated catalyst was violet as is characteristic of anhydrous chromic chloride.

The Chlorine-Source Organic Compound Plus Chlorine

Because the members of this group, e.g., chloroform, do not generate sufficient chlorine to cause the effective redistribution of chromic chloride or mixed chromic chlorofluorides, the catalyst also must be reacted with chlorine. Reaction of the spent catalyst with chlorine and the organic compound can be simultaneous or reaction with chlorine can take place after reaction with the organic compound.

Methylene chloride, although closely related to chloroform is inoperable in the process of this invention. Both hydrogen chloride alone and chlorine alone are likewise inoperable in the process of this invention.

Reactivation does not occur when spent catalysts are contacted with regenerants at high pressures. It is not clear at what pressure reactivation ceases to be effective or why increased pressures should cause the process to become ineffective. It is also not known if there is a sharp cut-off at a specific pressure where the process ceases to be effective or if effectiveness gradually decreases with increasing pressure although the latter seems more likely to occur. It is known, however, that reactivation does not occur at pressures of 4.4 atmospheres and above. For best results, the conditions of pressure should be atmospheric or only slightly above atmospheric.

EXAMPLES

The following Examples are meant to illustrate but not to limit this invention. In these Examples, spent catalysts were charged to a laboratory size packed reactor column. Without removing the catalyst from the column, the catalyst was tested for conversion, thereafter subjected to reactivating conditions, and then retested for conversion.

The standard test for conversion consisted in passing a mixture 1,1,2-trichloro-1,2,2-trifluoroethane and hydrogen fluoride over the catalyst and measuring the conversion to more highly fluorinated 1,2-dichloro-1,1,2,2-tetrafluoroethane.

The test reactor comprised a device simulating a commercial reactor tower, made from two vertical pieces of 2.54 × 76.2 cm nickel-chromium ("Inconel") pipe connected at the bottom to describe a U-shaped reactor. The upstream pipe or leg was empty and served as a preheater and the downstream leg was packed with 165 ml. of the granular catalyst. The reactor was immersed in a molten bath of a eutectic mixture of $KNO_3$, $NaNO_3$ and $NaNO_2$ ("Hitec").

When the device was employed in the standard test for catalyst activity the bath was maintained at 375°C. and a mixture of 1,1,2-trichloro-1,2,2-trifluoroethane (0.506 mol./hr.) and hydrogen fluoride (1.560 mol./hr.) was fed to the upstream leg. Gases passing out of the reactor were passed through an ice-chilled 5 wt. % KOH bubbler, where a part of the organic product condensed and the hydrogen fluoride was neutralized. The gas stream leaving the bubbler was passed through a gas sampling bulb to a gas volume measuring device. The collected liquid sample and the gas sample were analyzed by gas chromatography. From the data of the experiment the number of moles of 1,2-dichloro-1,1,2,2-tetrafluoroethane was calculated. This number divided by the number of moles of 1,1,2-trichloro-1,2,2-trifluoroethane charged and the result multiplied by 100 yielded the percent conversion which was taken as a measure of the activity of the catalyst.

When the device was used for the reactivation of catalyst the regenerant was charged to the upstream leg and the products leaving the reactor were discarded. The spent catalysts examined had become spent in the catalysis of halogen exchange between hydrogen fluoride and chlorinated ethanes such as hexachloroethane, the latter prepared in situ by feeding tetrachloroethylene and an equivalent amount of chlorine.

EXAMPLES 1 to 7

The Table describes the results of seven experiments, all within the scope of the invention. In all cases, the conversions were remarkably improved. Each of the experiments was conducted for 2 hours at one atmosphere (absolute) pressure.

TABLE

| Example No. | $CrF_3$ on Carbon (Wt. %) | Spent Conversion (Mol. %) | Regenerant | Feed Rate (G/Hr.) | Temp. (C°) | Final Conversion (Mol. %) |
|---|---|---|---|---|---|---|
| 1 | 20 | 7.4 | $CCl_4$ | 50 | 375 | 24.1 (1) |
| 2 | 20 | 9.7 | $CCl_4$ | 50 | 450 | 40.0 (2) |
| 3 | 20 | 7.4 | $CCl_4$ | 50 | 300 | 12.8 |
| 4 | 30 | 9.3 | $CCl_4$ | 50 | 375 | 21.2 |
| 5 | 20 | 7.4 | $COCl_2$ | 30 | 375 | 41.0 |
| 6 | 20 | 7.8 | $CCl_3CCl_3$ (3) | 46 | 450 | 17.2 |
| 7 | 20 | 7.4 | $CCl_3F$ | 50 | 450 | 23.2 |

(1) After 100 hours use in exchange reaction between HF and 1,1,2-trichloro-1,2,2,-trifluoroethane at 375°C. under 21.4 atm. pressure the conversion was still 19.0 mol. % in standard test.
After 336 hours use in exchange reaction between HF and 1,1,2-trichloro-1,2,2-trifluoroethane at 375°C. under 21.4 atm. pressure the conversion was still 36.0 mol. % in standard test.
(3) Prepared in situ by simultaneous feeding of tetrachloroethylene and an equivalent amount of chlorine.

EXAMPLE 8

A commercial waste stream from a hydrogen fluoride-carbon tetrachloride exchange reaction having the composition

| | wt. % |
|---|---|
| trichlorofluoromethane | 2 |
| 1,1,2,2-tetrachloro-1,2-difluoroethane | 19 |
| carbon tetrachloride | 73 |
| unidentified | 6 | was found to reactivate a spent catalyst (less than 10 percent conversion) of 20 wt. % $CrF_3$-on-carbon under the conditions of Example No. 2 to provide a catalyst of 36.6 percent conversion.

EXAMPLE 9 and Comparisons

A spent $CrF_3$-on-carbon catalyst of 7.4 percent conversion, treated with 100 g. of chloroform at 450°C. over a period of 2 hours and, after flushing with nitrogen, thereafter treated with 17.7 g. chlorine in 6 liters of nitrogen over a period of 2 hours, was found to have a conversion of 38 percent.

Dichlorodifluoromethane, at 450°C., in analogous tests reactivated a 7.6 percent conversion spent catalyst only marginally. The conversion rose to 9.5 percent. Chloroform and methylene chloride employed alone reduced the conversion of the catalyst (from 16.9 to 10.1 percent and from 4.0 to 0.25 percent respectively).

The embodiments of the invention in which an exclusive property or privilege is claimed are defined as follows:

1. A process for reactivating a spent chromic (Cr III) fluoride halogen-exchange catalyst comprising reacting the spent catalyst, at a temperature from about 300° to 500°C., with a chlorine-source selected from
   i. a saturated organic compound containing 1 or 2 carbon atoms, from 2 to 6 chlorine atoms and no hydrogen atoms, capable of dissociation at reaction temperatures to produce chlorine, and
   ii. a saturated organic compound containing 1 or 2 carbon atoms and from 2 to 6 chlorine atoms, not capable of dissociation at reaction temperatures to produce chlorine, and chlorine, thereby converting at least a part of the chromic fluoride to chromic (Cr III) chloride.

2. A process according to claim 1 wherein the chlorine-source is an organic compound containing 1 or 2 carbon atoms, from 2 to 6 chlorine atoms and no hydrogen atoms, capable of dissociation at reaction temperatures to produce chlorine.

3. A process according to claim 2 wherein the chlorine-source is at least one member of the group carbon tetrachloride, phosgene, hexachloroethane and trichlorofluoromethane.

4. A process according to claim 3 wherein the chlorine-source is carbon tetrachloride.

5. A process according to claim 3 wherein the chlorine-source is phosgene.

6. A process according to claim 3 wherein the chlorine-source is hexachloroethane.

7. A process according to claim 6 wherein the hexachloroethane is formed in situ.

8. A process according to claim 3 wherein the chlorine-source is trichlorofluoromethane.

9. A process according to claim 1 wherein the chlorine-source is an organic compound containing 1 or 2 carbon atoms and from 2 to 6 chlorine atoms, not capable of dissociation at reaction temperatures to produce chlorine, and chlorine.

10. A process according to claim 9 wherein the chlorine-source is chloroform and chlorine.

* * * * *